United States Patent [19]

Dennis

[11] Patent Number: 4,734,038
[45] Date of Patent: Mar. 29, 1988

[54] SYSTEM AND METHOD FOR PSYCHO ACTUALIZED LEARNING

[75] Inventor: Larry W. Dennis, Portland, Oreg.

[73] Assignee: Turbo Management System, Portland, Oreg.

[21] Appl. No.: 29,257

[22] Filed: Mar. 23, 1987

[51] Int. Cl.⁴ .............................................. G09B 19/00
[52] U.S. Cl. .................................................. 434/236
[58] Field of Search ........................................ 434/236

[56] References Cited

U.S. PATENT DOCUMENTS 3,748,750 7/1973 Viemeister .................... 434/236

Primary Examiner—Gregory E. McNeill
Attorney, Agent, or Firm—Kolisch, Hartwell & Dickinson

[57] ABSTRACT

The method of the invention includes selecting the particular ideal behavior to be achieved; defining the steps to be taken to effectuate the modification; assigning a mnemonic device for each step to promote mental identification of the step; and providing a visual image of a role model for behavioral emulation wherein the role model acts out the defined steps. The method further includes the steps of simultaneously providing an auditory cue with the visual image to reduce distracting influences directed towards the person and posterizing the image to eliminate the visual personality and characteristics of the role model.

The system of the invention for achieving ideal behavior in a person by following a set of defined steps to be taken to effectuate the modification of the selected behavior includes a mnemonic device assigned to each step to promote mental identification thereof and a visual image of a role model whose behavior is to be emulated, wherein the role model acts out the steps.

15 Claims, 5 Drawing Figures

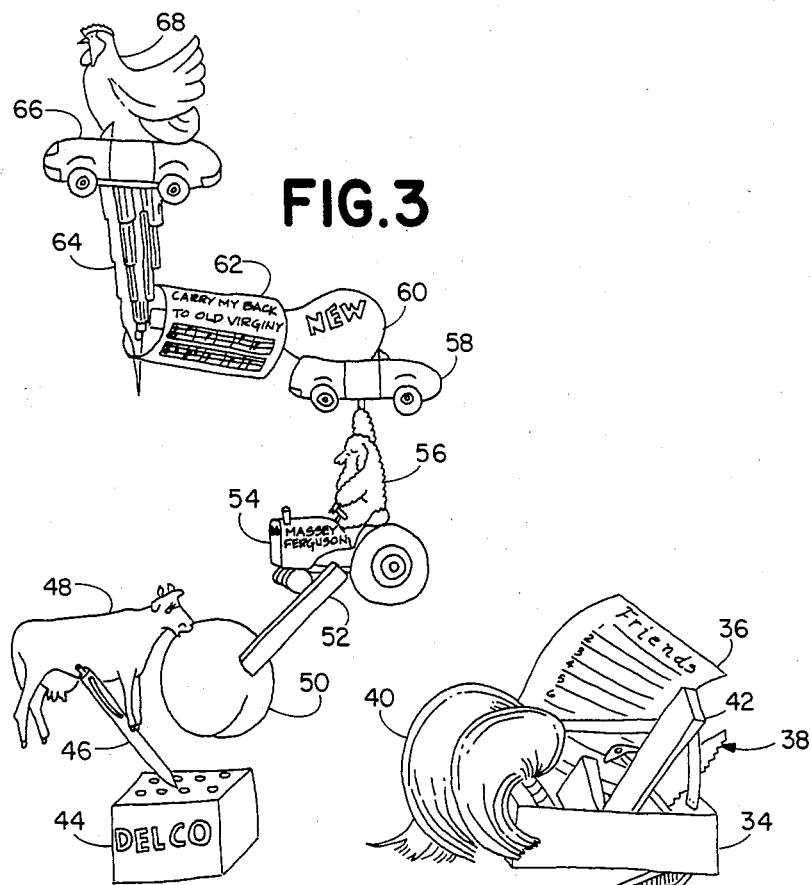
FIG. 3
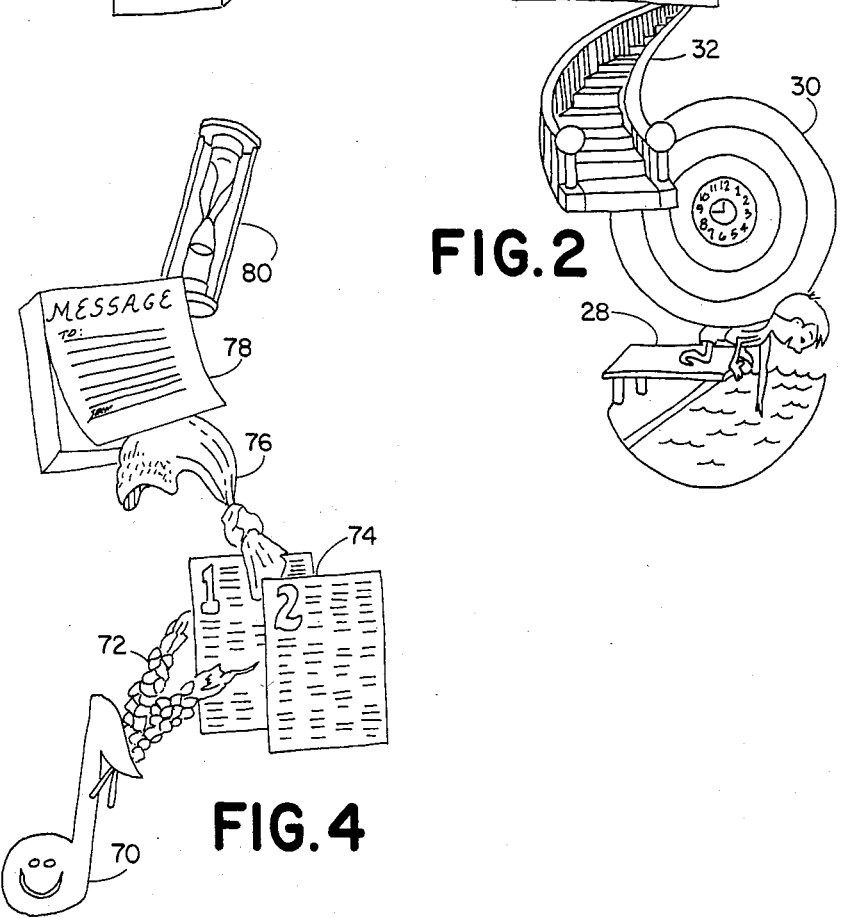
FIG. 2
FIG. 4

SYSTEM AND METHOD FOR PSYCHO ACTUALIZED LEARNING

BACKGROUND AND SUMMARY OF THE INVENTION

The invention relates to behavior modification and specifically to a method and system for modifying human behavior of a person with respect to a particular, selected behavior by providing an ideal, standardized modeled behavior for the person to emulate.

Known methods and systems for behavior modification rely on a variety of techniques to assist or cajole the person or subject into changing a behavior or a set of behaviors. Presentation techniques for behavior modification range from self-help publications to one-on-one sessions to group encounters. The lecture technique may include presentations wherein a speaker addresses the individual or a group or, wherein the speaker is captured on film or a video tape for viewing at a later time.

A shortcoming of the aforementioned methods and systems is that the subject tends to disassociate from the presentation, i.e., the subject, as a defense mechanism, develops the attitude that "this doesn't apply to me or my situation." Thus the subject is in the position of a viewer, outside of the presentation, which is attempting to modify the subject's behavior rather than a participant personally relating to the ideal behavior being taught.

An object of the instant invention is to provide a method and a system for behavior modification which compels the subject to become involved, emotionally and intellectually, in the behavior modification process.

Another object of the invention is to provide a method and system for behavior modification through psycho actualized learning.

A further object of the instant invention is to provide a method and system for behavior modification which provides an ideal standardized modeled behavior for the subject to emulate.

The method of the invention includes selecting the particular behavior to be modified; defining the steps to be taken to effectuate the ideal behavior; assigning a mnemonic device for each step to promote mental identification and retention of the step; and providing a visual image of a role model for behavioral emulation wherein the role model acts out the defined steps. The method further includes the steps of simultaneously providing an auditory cue with the visual image to reduce distracting influences directed towards the person and posterizing the image to eliminate the visual personality and characteristics of the role model.

The system of the invention for modifying a selected behavior in a person by following a set of defined steps to be taken to effectuate the modification of the selected behavior includes a mnemonic device assigned to each step to promote mental identification thereof and a visual image of a role model whose behavior is to be emulated, wherein the role model acts out the steps.

These and other objects and advantages of the invention will become more fully apparent as the description which follows is read in conjunction with the drawings.

DESCRIPTION OF THE DRAWINGS

FIGS. 2-4 are sample mnemonic stacks of the invention.

DETAILED DESCRIPTION OF THE PREFERRED EMBODIMENT

The psycho actualized learning method and system of the invention compels the subject, in a pleasant manner, to involve himself, both intellectually and emotionally, in the learning process which will lead to a change in his behavior. A block diagram illustrating the learning method and system of the invention is shown generally at 10 in FIG. 1. The problem with learning in general and specifically with learning which is intended to lead to behavior modification, is that the subject disassociates from the material being presented and adopts the attitude that "this doesn't apply to me or my situation." The learning method and system of the invention provides a model of ideal behavior, or role model, in a manner which makes the subject retain the presentation in his memory.

Figure 1:
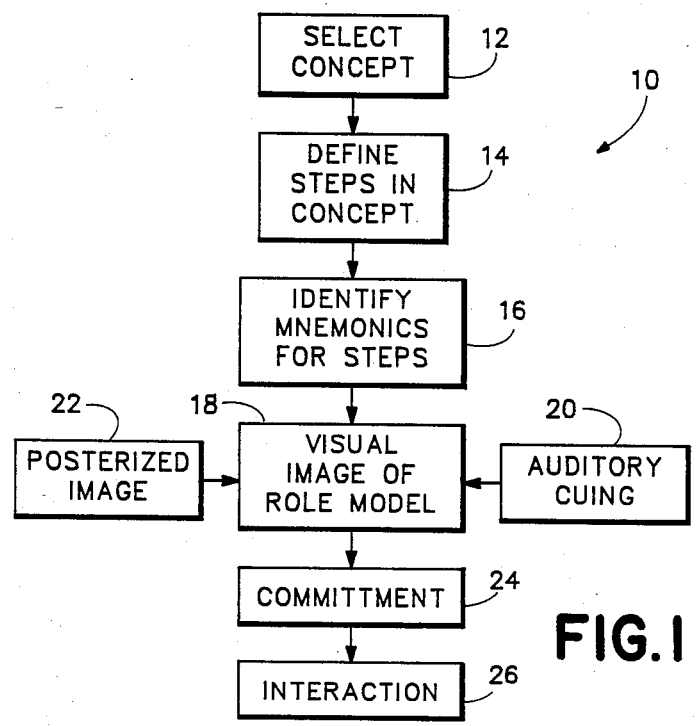
FIG. 1 is a block diagram illustrating the method and system of the invention.

The method and system of modifying human behavior taught herein is referred to as psycho actualized learning. The method recognizes that a human being can assimilate only a limited amount of information at any time. A single behavior must be focused upon in order to modify the behavior of a person, also referred to herein as the subject. Another way of stating this concept is that the method must use conciseness and present only one particular behavior to be assimilated by the subject at any one time. Thus the first step in the method, as depicted by block 12 in FIG. 1 is that of selecting the singular behavior or concept to be modified.

Once the concept or behavior has been selected, steps are defined which are to be taken to arrive at the ideal behavior, as depicted in block 14. Again, the number of steps is limited to present a concise outline that the subject is to follow.

The next step is to identify mnemonics that relate to each of the steps, as shown in block 16. A mnemonic is a device for assisting or intended to assist the memory. In the preferred embodiment, it is a picture or a device which is easy to remember and which represents an abstract concept. The subject need only remember a mnemonic or a mnemonic stack rather than having to remember an abstract representations of the concept in the form of words. This is particularly effective because people think in terms of concrete pictures rather than in abstract words.

Next, a visual image of a role model, block 18, is provided, wherein the role model acts out an ideal, standardized model behavior for the subject to emulate. Erroneous or wrong behavior is not modeled except as an attention getter, and then only in very limited situations. The role model acts out the steps previously defined to demonstrate the appropriate manner in which the subject should act or respond to a given situation.

The visual image may be enhanced by two collateral techniques. The first is auditory cueing, block 20. In the preferred embodiment, auditory cueing takes the form of what is referred to herein as white music. White music is music without a rythm or beat which is not distracting to the subject in that it is not meaningful, but acts to block out extraneous mental inputs. The use of white music tends to induce a near-alpha state, which is that state entered by a person when the person first starts to go to sleep. A person in a alpha state is highly receptive to suggestion. The use of white music as a auditory cue therefore facilitates the learning process.

Figure 5:
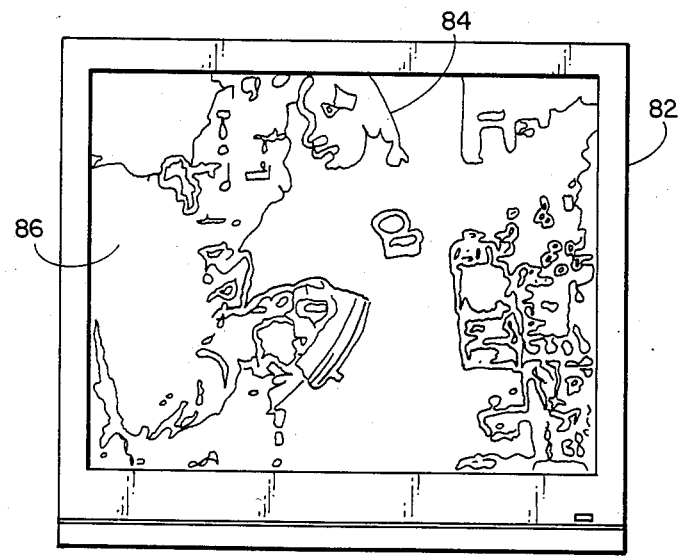
FIG. 5 is a video display of a posterized image of the invention.

Certain presentations of the role model, to be further described herein, are accomplished by what is referred to herein as a psycho empathetic, or posterized image. This type of image is achieved through a special effects video generator used in connection with a video system which destroys the integrity of the actors, models and background who are modeling ideal behavior. The subject is unable to indentify the actors in terms of race, age, etc., but can still tell what the actors are modeling. The subject is not distracted or put-off by the visual personality or characteristic of the actors and is therefore more easily able to project himself into the behavior which is being modeled. Posterization essentially removes the chromanants in a video picture by reducing the gradations of tone leaving only an outline of the actors. FIG. 5 is an example of a posterized image as viewed on video monitor 82. An image which has been posterized more easily enables the subject to identify with the role model on the screen. FIG. 5 depicts two actors in a retail store setting. Actor 84 is a role model of a clerk while actor 86 is playing the role of a customer.

Another step in the method of the invention is to ask the subject to make a commitment to actively participate in the modification of their own behavior, as depicted by block 24. A subject that has been asked to modify a long standing behavior is placed in an uncomfortable position and is likely to become defensive. By asking for a commitment from the subject, the subject is less likely to feel that he is being tricked or coerced into allowing his behavior to be changed. The subject is asked to involve himself, intellectually and emotionally, in the behavior modification process. Additionally, the subject is asked to role play with a video display.

After the subject has viewed the initial presentation, the subject is asked to interact with another person, also endeavoring to develop skill in ideal behavior in the same concept or behavior, in what is referred to as a "buddy" system, block 26. The subject is asked to perform additional role playing with the partner or buddy, to make a commitment to the partner to use the defined steps, and to meet with their partner at a later date, usually one week, with the results of having used the defined steps.

One way to present the behavior modification method and system of the invention is through the use of a video presentation. The concept or ideal behavior is initially selected and is the subject of an entire instruction session, which should run no more than 20-30 minutes.

After the steps have been defined and the mnemonics identified, the steps to achieve the ideal behavior are acted out by actors who serve as role models and antagonists. As the actors proceed through the defined steps, the mnemonic device for that step is shown at an edge or corner of the image. Auditory cueing, or white music, is also provided simultaneously with the visual image. Next, the visual image is posterized and the sequence repeated without the mnemonic device but with the auditory cue.

In situations where the subject is being taught to achieve an ideal behavior with respect to another person, a visual image is displayed from the point of view of the role model wherein the subject is allowed to see only the person (antagonist) with whom they are dealing. This scene is also played a second time in posterized form. The auditory cue continues throughout display of the role model and the visual image.

The first commitment that the subject is asked to make is to role play with the video display. In this sequence, the soundtrack of the presentation contains only the dialogue of the antagonist and does not include the words which were originally spoken by the role model. The mnemonic is flashed on the screen and the subject is expected to react by restating the words originally spoken by the role model. As previously noted, the subject is then asked to make further commitment to their partner and to interact with their partner.

To further explain the context in which the above steps are carried out, an example of one form of a psycho actualized learning session will be described. This example will revolve generally around stimulating and motivating the subjects to achieve better-on-the job performance. The specific concept will be to motivate the subjects to set personal and business goals. Steps in setting personal and business goals are defined as follows:

1. Assess the situation as it presently exists.
2. Set the goal in terms of what and when.
3. Define the goal in terms of manageable steps.
4. Get help in achieving the goal.
5. Gather resources which will be necessary to accomplish the goal.
6. Enlist co-workers to provide encouragement in the achieving the goal.
7. Check progress toward the goal.

Once the steps have been defined, the mnemonics are identified for each of the steps. Referring now to FIG. 2, the mnemonic stack for the previously defined steps are shown. The first image in the mnemonic stack is a man on a diving board checking the water in a pool, as shown at 28. This individual is assessing the situation as it presently exists The next mnemonic is a target with a clock in the bulls-eye at 30. The target identifies the goal (what) and the clock signifies the when aspect of the step. Next, a stairway 32 represents a set of manageable steps to be taken in order to achieve the goal. At the top of the stairway is a tool box 34 which has a number of items therein. The first is a list of friends 36 which symbolizes people who can be looked to to help achieve the goal. Next are a collection of tools 38 which are in the box and which represent the resources necessary to accomplish the goal. A pompom 40 is shown to indicate a cheering section, which is those co-workers who will provide encouragement in achieving the goal. Finally, a large checkmark 42 is a reminder to check on progress as the subject works toward their goal.

Examples of other mnemonic stacks are shown in FIGS. 3 and 4. In FIG. 3, the mnemonic stack is intended to facilitate memory improvement. The mnemonic stack represents the order in which the original thirteen colonies ratified the Constitution. The first mnemonic device is a representation of a Delco ® battery 44. A large ball point pen 46 is adjacent the battery and extends to a jersey cow 48. The cow is eating a Georgia peach 50 which has a connecting rod 52 extending outward oo therefrom. The connecting rods touches a Massey Ferguson ® tractor 54 which is being driven by Mary's little lamb 56. The lamb has one paw extended in the air which is holding a car going south 58. A large ham 60 with the word "NEW" inscribed thereon is sitting in the car. A piece of sheet music 62 with the words "Carry Me Back to Old Virginy" is wrapped around the shank of the ham. An inverted model of the Empire State building 64 extends through the sheet music and has a northbound car sitting atop the building. A Rhode Island red hen 66 is perched on the steering wheel of the north-bound car. The mnemonics are representative of, in order, Delaware, Pennsylvania, New Jersey, Georgia, Connecticut, Massachusetts, Maryland, South Carolina, New Hampshire, Virginia, New York, North Carolina and Rhode Island.

Another behavior which may be modified through use of the method and system of the invention is the manner in which a person answers a telephone. In a business setting, it is important that phone messages be received and that the person answering the phone make a good impression on the caller. This is particularly important when the caller may be making an initial contact with a company and will at least partially evaluate the company as a result of how the business phone is answered. In this case, the concept or the behavior to be modified is that of answering a telephone. The steps are defined as answering the phone with cheerful expectancy; conveying a state of mind that emphasizes the person is glad to help the customer; paging the person more than once; stating that the person is not available if they cannot, for whatever reason, answer the telephone; asking to take a message and never leaving the caller on hold for more than a minute.

The mnemonic stack which has been identified for this defined set of steps is shown in FIG. 4 and includes a smiling note 70 which represents cheerful expectancy. A bundle of gladiolas 72 reminds the subject that they are glad to help the business customers. The two pages 74 represent that the person who has been called will be paged twice. A bridal veil with a knot 76 reminds the subject that if the person cannot answer the page, the caller will be told that the person is not available. A message pad 78 reminds the subject that they should take a message while the timer 80 reminds them to not leave the caller on hold for more than a minute.

The method and system of the invention present a model of ideal behavior for the subject. The behavior is repeated in a manner to create an indelible image in the subject's mind which will affect the way in which the subject performs habitual acts. The presentation is designed to avoid disassociation on the part of the subject to make him more willing to learn and able to learn the ideal behavior.

Although a preferred embodiment of the method and system of the invention have been disclosed, it should be appreciated that variations and modifications may be made thereto without departing from the spirit of the invention.

It is claimed and desired to secure as letters patent:

1. A method for modifying human behavior of a person comprising:
   selecting the particular behavior to be modified;
   defining the steps to be taken to effectuate the modification;
   assigning a mnemonic device for each step to promote mental identification of the step; and
   providing a visual image of a role model for behavioral emulation wherein the role model acts out the defined steps.

2. The method of claim 1 which further includes asking the person to make a commitment to actively participate in the behavior modification.

3. The method of claim 1 which further includes pairing a person with a second person to form a support pair.

4. The method of claim 1 wherein the step of providing a visual image includes simultaneously providing an auditory cue to reduce distracting influences directed towards the person.

5. The method of claim 1 wherein the step of providing a visual image includes posterizing the image to eliminate the visual personality and characteristics of the role model.

6. The method of claim 1 which further includes simultaneously providing, with the visual image of the role model, a visual image of the mnemonic associated with a defined step as portrayed by the role model.

7. A method for modifying human behavior of a person comprising:
   selecting the particular behavior to be modified;
   defining the steps to be taken to effectuate the modification;
   assigning a mnemonic device for each step to promote mental identification of the step;
   providing a psycho empathetic image of a role model for behavioral emulation wherein the role model acts out the defined steps; and which further includes simultaneously providing, with the image of the role model, a visual image of the mnemonic associated with a defined step as portrayed by the role model wherein the image is posterized to eliminate the visual personality and characteristics of the role model.

8. The method of claim 7 which further includes asking the person to make a commitment to actively participate in the behavior modification.

9. The method of claim 7 which further includes pairing a person with a second person to form a support pair.

10. The method of claim 7 wherein the step of providing a visual image includes simultaneously providing an auditory cue to reduce distracting influences directed towards the person.

11. A system for modifying a selected behavior in a person by following a set of defined steps to be taken to effectuate the modification of the selected behavior comprising:
    a mnemonic device assigned to each of the steps to promote mental identification thereof; and
    a visual image of a role model whose behavior is to be emulated, wherein the role model acts out the steps.

12. The system of claim 11 which further includes a support system comprised of the person and at least one other person undergoing modification of the selected behavior.

13. The system of claim 11 which further includes auditory cues to reduce distracting influences directed towards the person.

14. The system of claim 11 wherein said visual image is a posterized image which eliminates the visual personality and characteristics of the role model.

15. The system of claim 11 wherein the visual image of the role model is simultaneously displayed with a visual image of the mnemonic associated with the defined step as the step is portrayed by the role model.

* * * * *